(12) United States Patent
Sanders

(10) Patent No.: US 9,914,398 B1
(45) Date of Patent: Mar. 13, 2018

(54) VEHICLE STORAGE COMPARTMENT

(71) Applicant: Honda Motor Co., Ltd., Tokyo (JP)

(72) Inventor: Brandon M. Sanders, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/454,705

(22) Filed: Mar. 9, 2017

(51) Int. Cl.
B60R 7/06 (2006.01)

(52) U.S. Cl.
CPC ..................... B60R 7/06 (2013.01)

(58) Field of Classification Search
CPC .................. B60R 7/06; B60R 7/04
USPC .............................. 296/37.8, 37.12
See application file for complete search history.

(56) References Cited

U.S. PATENT DOCUMENTS

| | | | |
|---|---|---|---|
| 2,796,310 | A | 6/1957 | Anderson |
| 5,460,309 | A | 10/1995 | Nehl et al. |
| 7,926,861 | B2 | 4/2011 | Merlo et al. |
| 8,231,190 | B2 | 7/2012 | Ertz et al. |
| 8,393,663 | B2 | 3/2013 | Gayon et al. |
| 8,602,476 | B2 | 12/2013 | Doll |
| 8,919,852 | B2 | 12/2014 | Schulz |
| 9,533,622 | B2 | 1/2017 | Huebner et al. |
| 2006/0197353 | A1* | 9/2006 | Hanzel ............... B60R 11/00 296/37.12 |
| 2011/0169292 | A1* | 7/2011 | Gayon ............... B60R 7/06 296/37.12 |
| 2017/0158142 | A1* | 6/2017 | Oldani ............... B60R 7/06 |

FOREIGN PATENT DOCUMENTS

| | | |
|---|---|---|
| CN | 202656943 U | 1/2013 |
| CN | 104271402 A | 1/2015 |
| CN | 205523999 U | 8/2016 |
| FR | 2880852 A1 | 7/2006 |
| FR | 2906774 A1 | 4/2008 |
| KR | 20120047571 A | 5/2012 |
| WO | 2000006954 A | 2/2000 |

* cited by examiner

*Primary Examiner* — Jason S Morrow
(74) *Attorney, Agent, or Firm* — Honda Patents & Technologies North America, LLC; Gregory J. Burke

(57) ABSTRACT

A vehicle storage compartment includes a frame, a drawer within the frame, a pivoting door, and a linkage system interconnecting the frame, the drawer and the door such that pivot of the door causes sliding of the drawer. The linkage system can include a link having a door post and a drawer post respectively engageable with the door and a guide track on the drawer. The linkage system can also include a projection on the drawer engaging a rail. The door post of the link can be disengaged from the door for movement of the door to a fully-lowered position defined by a stop. The drawer post can be disengaged from the drawer for separation of the drawer from the frame. The link can pivot on a hinge pin and can be translated on the pin for engagement and disengagement of the door and drawer posts.

20 Claims, 12 Drawing Sheets

VEHICLE STORAGE COMPARTMENT

BACKGROUND

Vehicle storage compartments, such as glove compartments, provide convenient locations in a vehicle for storing a variety of articles. The storage compartments typically include a door that pivots with respect to a housing for enclosing an interior. Vehicle storage compartments sometimes include a separate drawer disposed within the interior for receiving storage articles.

SUMMARY

According to one aspect, a vehicle storage compartment includes a frame defining an interior, a door pivotally connected to the frame for pivot of the door between closed and opened positions about a pivot axis, and a drawer translatable with respect to the frame for translation between a stored position in which the drawer is disposed within the interior of the frame and a deployed position in which at least a portion of the drawer is located outside of the interior. The drawer includes opposite first and second sidewalls.

The vehicle storage compartment also includes a linkage system interconnecting the door and the drawer such that pivoting of the door about the pivot axis between the closed and opened positions causes sliding movement of the drawer between the stored and deployed positions. The linkage system includes at least one link member connected to the door such that the link member pivots with the door during movement of the door between the closed and opened positions. The link member also includes a drawer post engaging one of the sidewalls of the drawer.

According to another aspect, a vehicle storage compartment includes a frame with first and second sidewalls defining an interior, a door pivotally connected to the frame for pivot of the door between closed and opened positions about a pivot axis, and a drawer slidable with respect to the frame for movement between a retracted position in which the drawer is disposed within the interior of the frame and a deployed position in which at least a portion of the drawer is located outside of the interior. The drawer includes first and second sidewalls each including a guide track recess and an elongated projection.

The vehicle storage compartment includes first and second rails with elongated recesses respectively secured to the first and second sidewalls of the frame. The elongated projections on the sidewalls of the drawer engage the recesses of the rails. The vehicle storage compartment includes first and second links disposed adjacent to the first and second sidewalls of the drawer. Each of the links includes a drawer post. The drawer posts of the links engage the guide track recesses on the sidewalls of the drawer such that pivoting of the door causes sliding of the drawer.

According to a further aspect, a vehicle storage compartment includes a frame defining an interior and a drawer. The drawer, which is slidably mounted in the frame interior, defines a guide track recess. The storage compartment also includes a door pivotally connected to the frame for pivot between closed and opened positions and a link member including a drawer post and a door post The drawer post is engageable with the guide track recess of the drawer, and the door post is engageable with a link mount formation on the door such that pivoting of the door causes sliding of the drawer. The link member is pivotally mounted on a hinge pin for pivot with the door between the closed and opened positions. The link member is also translatable along the hinge pin for disengagement of the door post from the door and disengagement of the drawer post from the door.

DETAILED DESCRIPTION

With reference now to the figures wherein the illustrations are for purposes of illustrating one or more exemplary embodiments and not for purposes of limiting the same, there is shown a storage compartment 100 for a vehicle. Reference will initially be made to FIGS. 1 to 7 to describe the construction of the exemplary storage compartment and the normal operation for the storage compartment, and then to FIGS. 8 to 14 to describe a drawer-removal procedure associated with the exemplary storage compartment.

Figure 1:
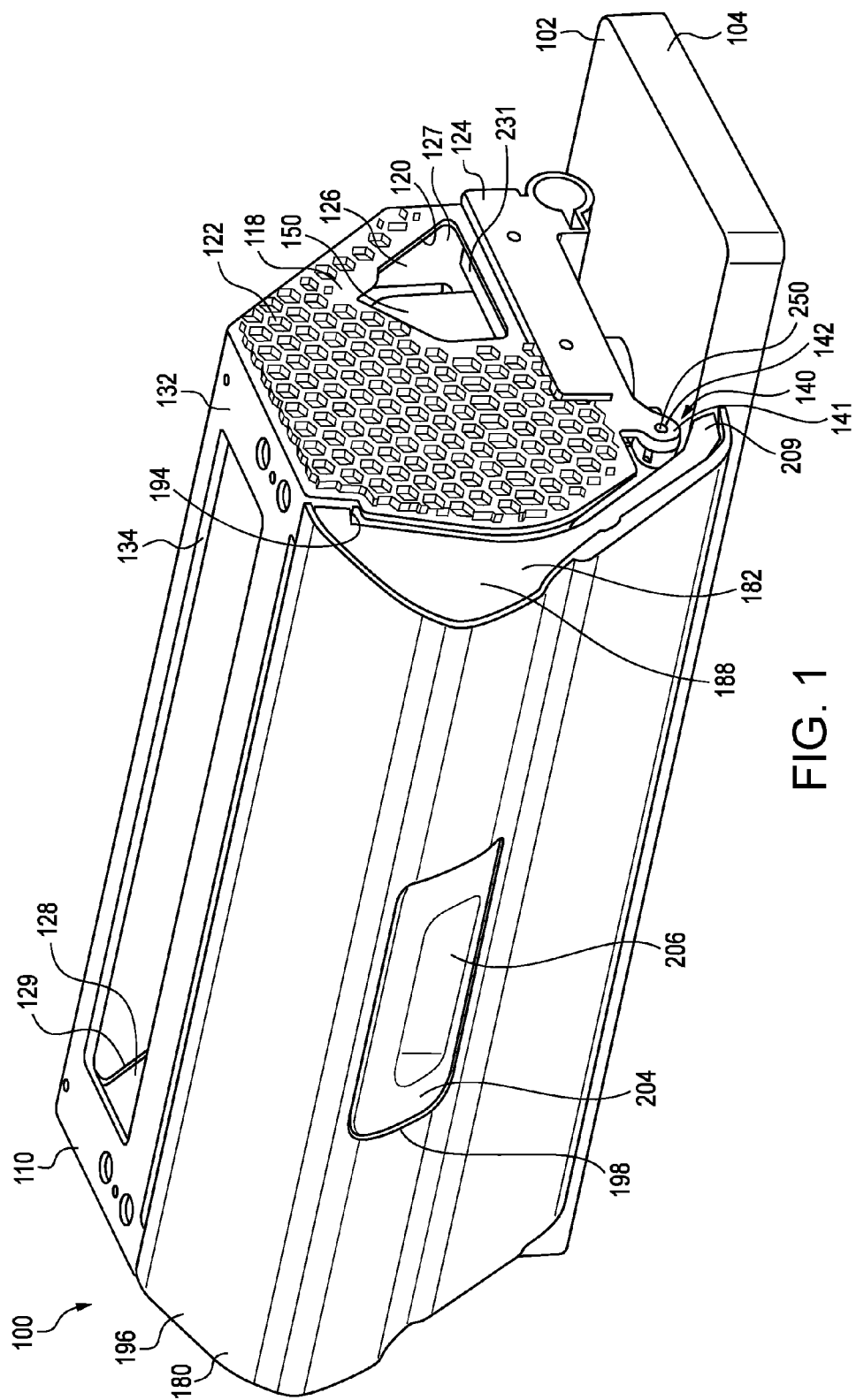
FIG. 1 is a perspective view of a vehicle storage compartment according to an exemplary embodiment shown in a closed condition.
Figure 2:
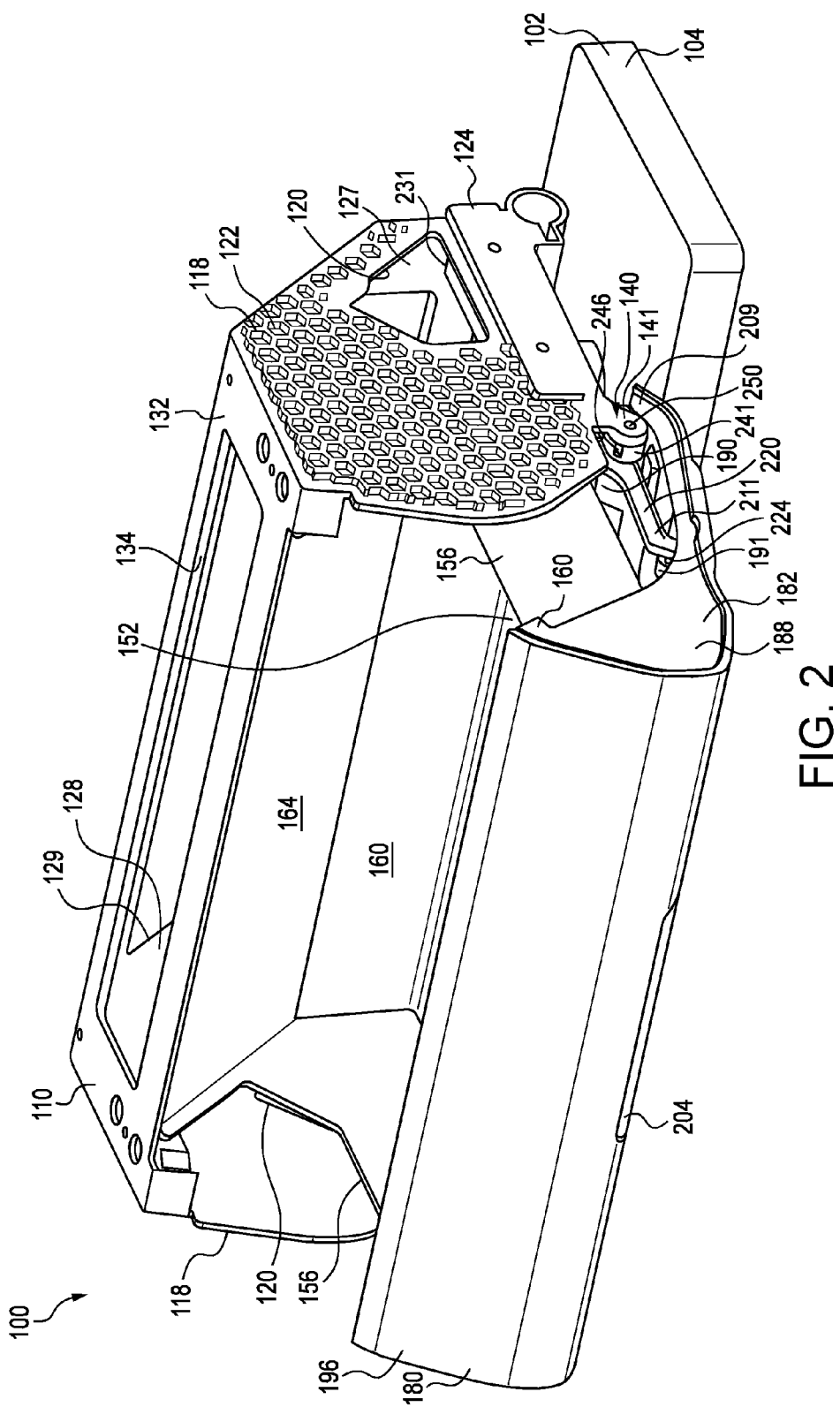
FIG. 2 is a perspective view of the vehicle storage compartment of FIG. 1 in an opened condition.

Referring to FIGS. 1 and 2, the storage compartment 100 is shown in a closed condition and an opened condition, respectively. In the figures, the depicted storage compartment is a vehicle glove compartment (also known as a glove box or jockey box). As used herein, directional terms such as "upper", "lower", "upwardly", "downwardly", "forward", "rearward", "front", "back", "top", "bottom", "horizontal", "vertical", should be understood with respect to the glove compartment mounted in a vehicle (e.g., in a dashboard location in front of a front row passenger). The storage compartment 100 includes a frame (or housing) 110, a drawer 150 disposed within an interior of the frame 110, and a door 180 for closing an open rearward portion of the frame. As will be described, the drawer 150 is slidably mounted within the frame 110 and the door 180 is pivotally connected to the frame 110. As will also be described, the storage compartment 100 includes a linkage system that interconnects the door 180 and the drawer 150 such that the drawer 150 slides as the door 180 is pivoted.

Figure 3:
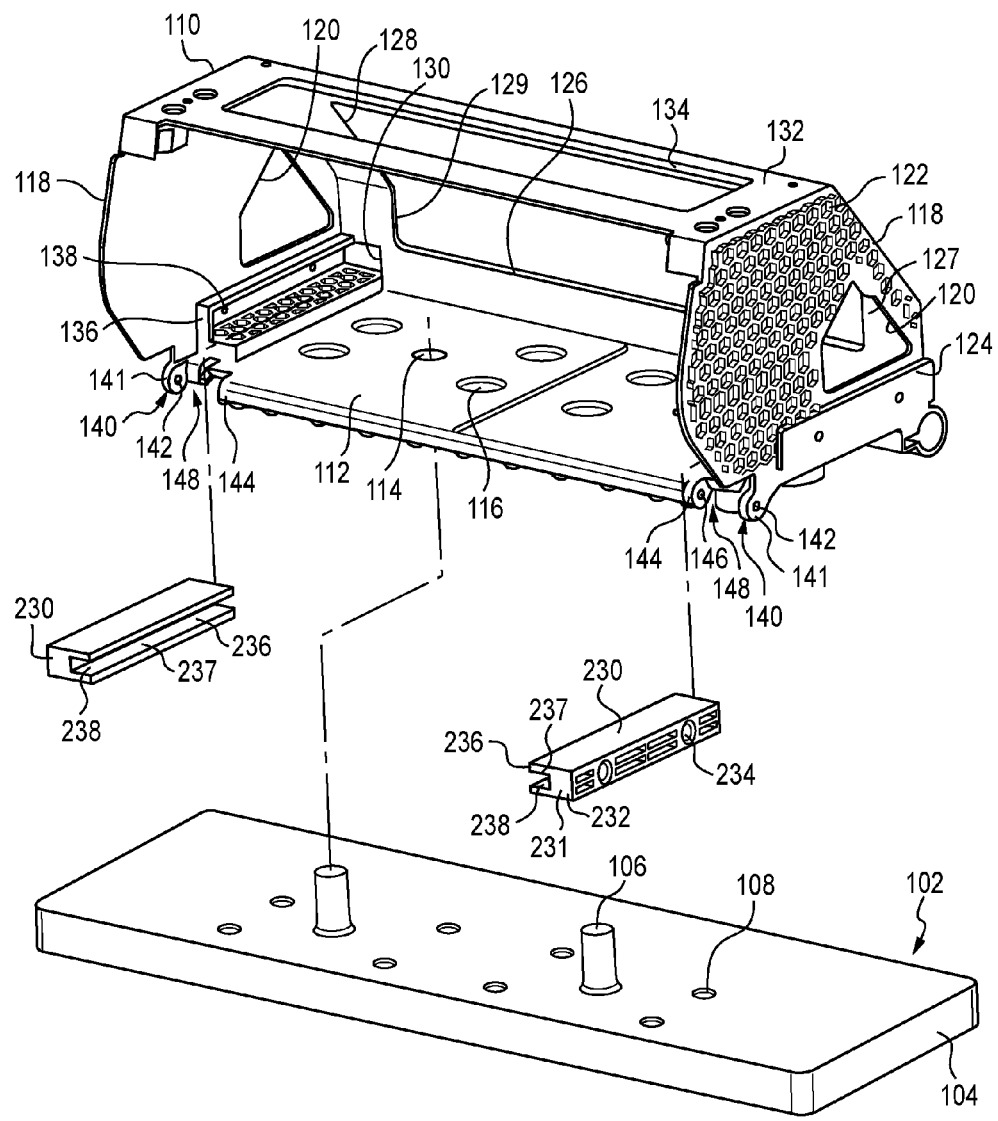
FIG. 3 is an exploded perspective view of a frame, a fixture, and left and right rails of the vehicle storage compartment of FIG. 1.
Figure 4:
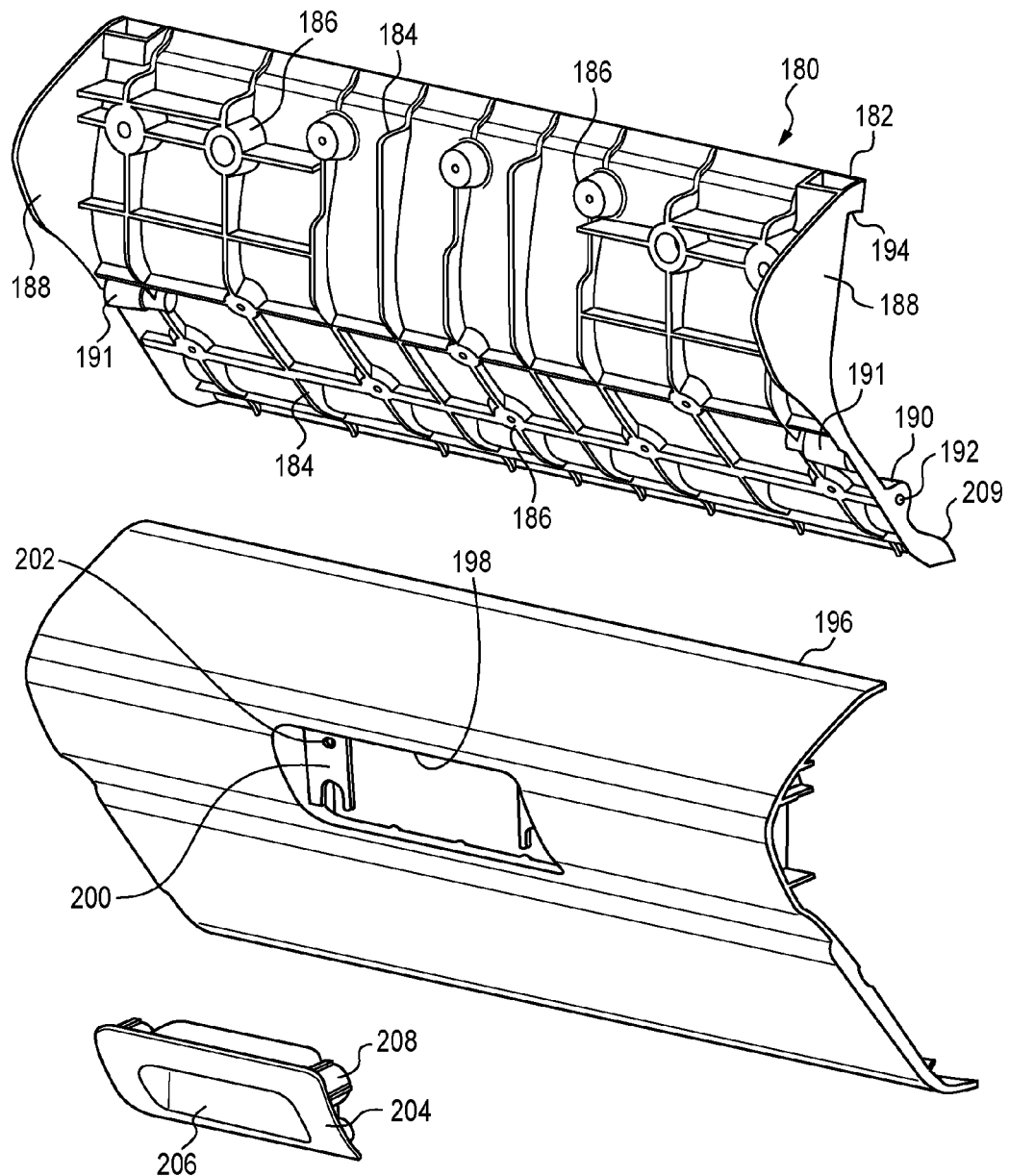
FIG. 4 is an exploded perspective view of an inner door part, an outer door part, and a grip of the vehicle storage compartment of FIG. 1.
Figure 5:
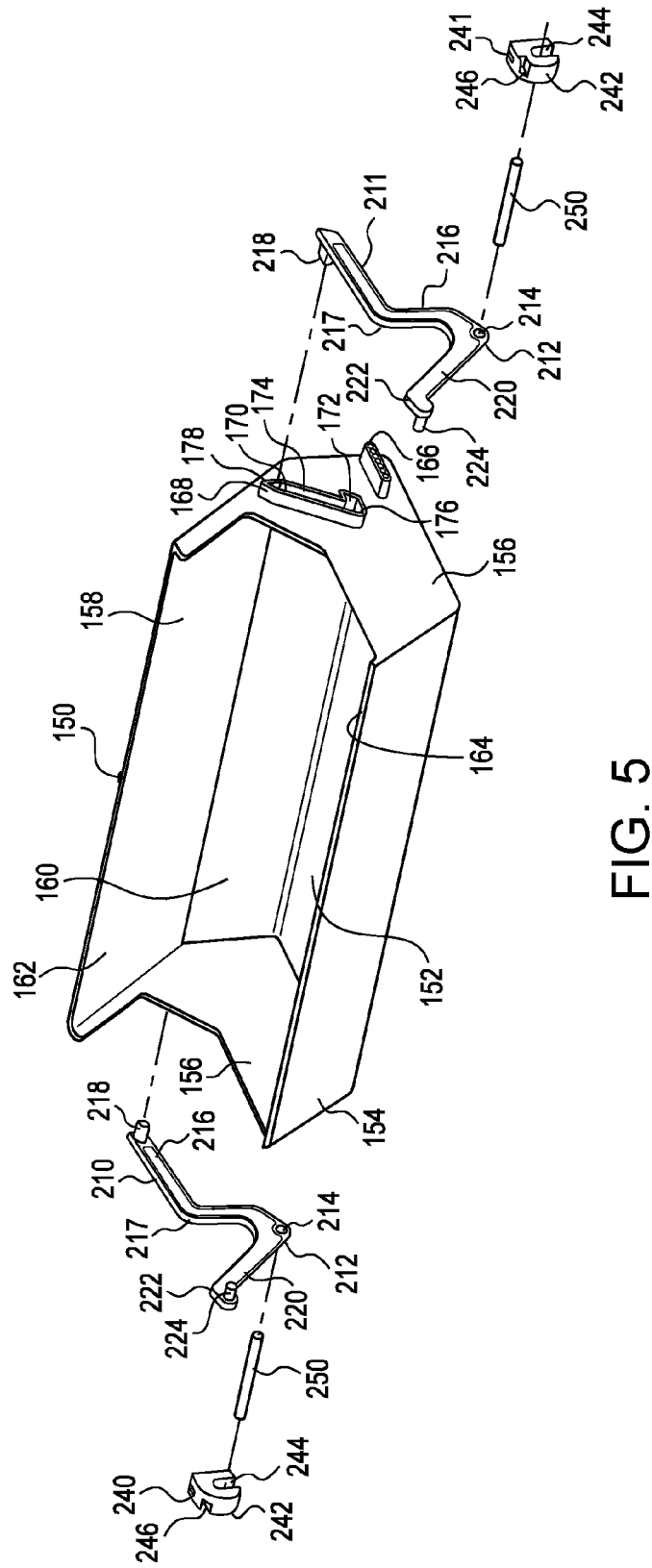
FIG. 5 is an exploded perspective view of a drawer, left and right link members, hinge pins, and left and right spacers of the vehicle storage compartment of FIG. 1.

Referring to FIGS. 3-5, the various components of the storage compartment 100 are shown in greater detail. FIG. 3 shows an exploded view including the frame 110, the left and right rails 230, 231, and a fixture (or base) 102 on which the frame 110 is mounted. The fixture 102 includes a plate 104 and a pair of cylindrical posts 106 extending upwardly from the plate 104. The posts 106 are arranged for receipt by a pair of openings 114 in a bottom portion 112 of the frame 110. The plate 104 of the fixture 102 further includes openings 108 arranged to align with openings 116 of the bottom portion 112 of frame 110 for receipt of fasteners (not shown) to secure the frame 110 to the fixture 102. It is not a requirement that the storage compartment 100 include a fixture or base as depicted. Instead, the frame 110 could be connected directly to a vehicle component such as an instrument panel (not shown), for example, without an intervening base or fixture.

The frame 110 includes left and right sidewalls 118, a front wall 126, and a top wall 132 connected to the sidewalls 118 and the front wall 126. The front wall 126 includes a lower part 127 extending substantially vertically from the bottom portion 112 and an upper part 128 extending obliquely from the lower part 127. The front wall 126 includes an opening 129 encompassing a majority of the front wall 126 to facilitate access through the front wall 126 (e.g., through the interior of the frame 110, and the front wall, to an area of the vehicle located in front of frame 110). The top wall 132 of frame 110 also includes an opening 134 covering a majority of the top wall 132 for access into the frame 110. Each of the sidewalls 118 of frame 110 includes an access opening 120 defined by a lower front portion of the sidewall 118.

Each of the sidewalls 118 of frame 110 includes a honeycombed structure 122 disposed on a majority of an external surface. The honeycombed structure 122 serves to reinforce the sidewalls 118 while optimizing strength and weight considerations. Such reinforcement could be beneficial to the overall integrity of frame 110 considering the size of the openings 129, 134 in the front and top walls 126, 132, the inclusion of access openings 120 in the sidewalls 118 and the open rearward end of the frame 110.

The frame 110 includes left and right rail mounts 136 (the left rail mount is shown in FIG. 3) on which the rails 230, 231 are mounted. The depicted rail mounts 136 are L-shaped in cross-section having vertical and horizontal leg portions integrally formed with the sidewalls 118 and the bottom portion 112 of the frame 110. The vertical leg portion of the rail mount 136 on the sidewall 118 includes a pair of openings 138 for receipt of fasteners (not shown) for securing the rails 230, 231 to the frame 110. It is not required that the rails 230, 231 are fastened to the frame 110. Other alternative joining methods known in the art, such as snap-fit connection, adhesives or welding, for example, could be used. It is also not a requirement that the rails 230, 231 are separate components joined to the frame 110. It is conceivable that the rails 230, 231 could be integrally formed (e.g., in a molding process) with the frame 110.

Each of the rails 230, 231 includes an outer mounting portion 232 and an inner track portion 236. The outer mounting portion 232 defines a pair of openings 234 for receiving fasteners (not shown) for securing the rails to the frame 110. The inner track portion 236 is channel-shaped to form an elongated groove 237 defining a substantially horizontal sliding path for the drawer 150. As shown in FIG. 3, the groove 237 of the rails 230, 231 is open at a rearward end 238 of the rail. As will be described further below with respect to FIGS. 8-14, the open end 238 of the groove 237 is useful as part of a drawer-removal procedure associated with the storage compartment 100.

The frame 110 includes left and right pin mounts 140 for receipt and support of a pair of hinge pins 250 (see FIGS. 2 and 5). Each pin mount 140 includes an outer portion 141 and an inner portion 144 separated by a space 148. As will be described below, the spaces 148 accommodate pin mount formations 190 of door 180, link members 210, 211, and spacers 240, 241 (see FIGS. 2 and 5). The outer and inner portions 141, 144 of the pin mounts 140 respectively define openings 142, 146 dimensioned for supporting receipt of the hinge pins 250. As shown in FIG. 3, the outer portions 141 of the pin mounts 140 are disc-shaped projections of the sidewalls 118 of frame 110 while the inner portions 144 are cylindrical formations disposed on a front edge of the bottom portion 112 of frame 110.

The front wall 126 of frame 110 includes openings 130 in the lower part 127 of the front wall 126 adjacent the rail mounts 136. The openings 130 provide access through the front wall 126 of frame 110 to the rail mount regions of the frame interior to facilitate insertion or removal of the rails 230, 231. The exterior of each sidewall 118 of frame 110 includes a thickened wall portion 124 (the right one is seen in FIG. 3) adjacent the rail mounts 136 to reinforce this portion of the sidewall 118 and to provide for sufficient material thickness for fastening the rails 230, 231 to the rail mounts 136.

FIG. 4 shows an exploded view of the door 180 of storage compartment 100. The door 180 includes an inner door part 182, an outer door part 196, and a grip 204. As used herein, the terms "inner" and "outer" as applied to the parts of the door 180 should be understood with respect to the door 180 in the closed position. The terms "forward" and "rearward" as applied to door 180 should be understood with respect to a vehicle having the depicted storage compartment 100 mounted in typical fashion (i.e., in a dashboard location in front of a front row passenger) with the door 180 in the closed position. Therefore, FIG. 4 for example principally shows rearward surfaces of the inner and outer door parts 182, 196 of door 180. The inner door part 182 includes reinforcing ribs 184 and boss formations 186 on the rearward surface of the inner door part 182. The boss formations 186 can be configured for receipt of fasteners (not shown) engaging cooperatively configured formations on the forward surface of the outer door part 196 for securing the inner door part 182 to the outer door part 196. It is not required, however, that the door 180 include fasteners for joining the inner and outer parts 182, 196. Other joining methods known in the art, such as snap-fit connection, adhesives or welding, could be used.

As introduced above, the door 180 includes mount formations 190 for mounting the door on hinge pins 250. The door 180 includes cylindrical formations adjacent left and right sides of the inner door part 182 towards a lower end of the door providing the mount formations 190 (see FIGS. 10 and 11). Each of the cylindrical mount formations 190 includes an opening 192 dimensioned for receipt onto an associated one of the hinge pins 250 for pivotal support of the door 180 on frame 110.

Figure 11:
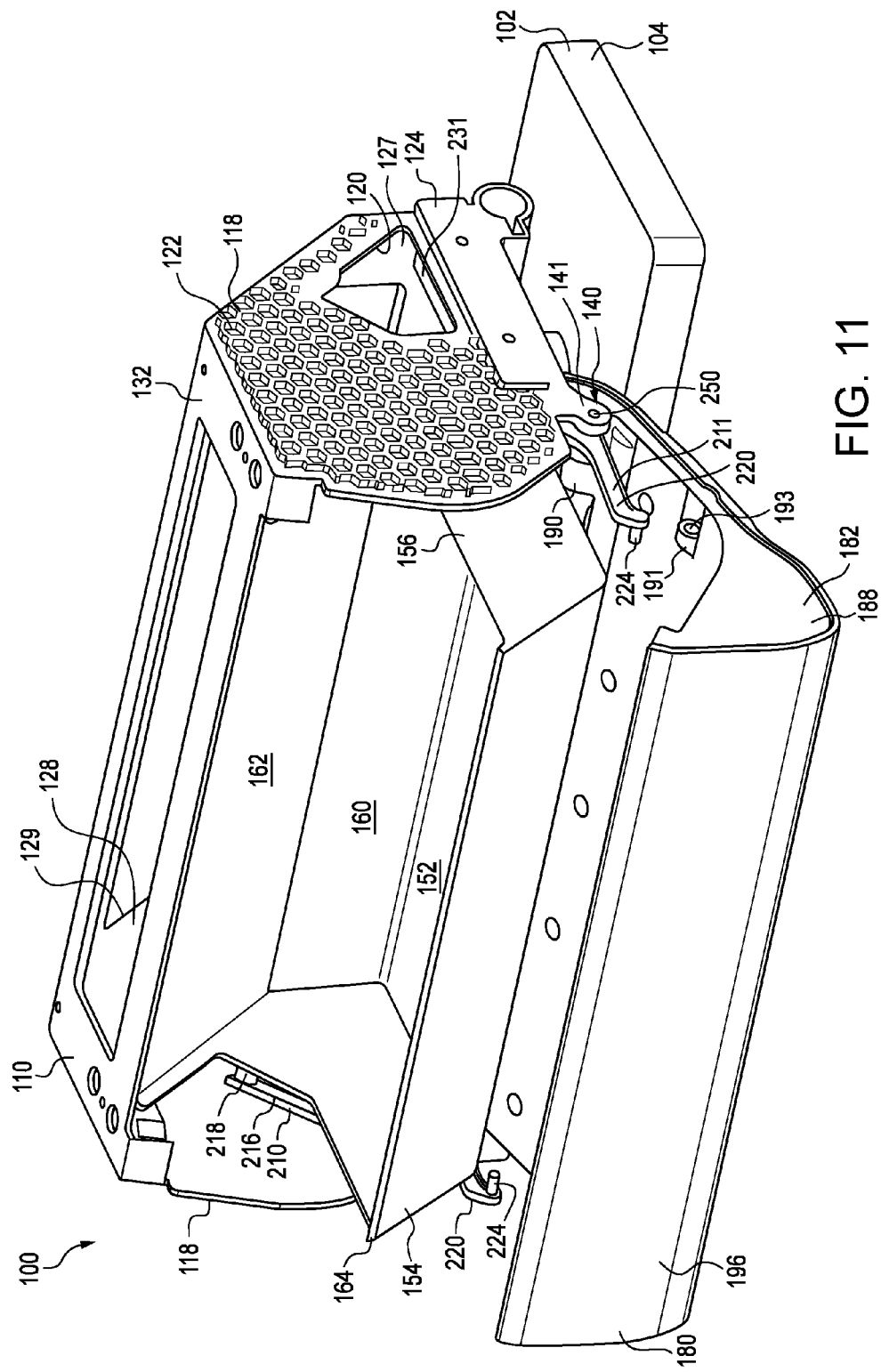
FIG. 11 is a perspective view of the vehicle storage compartment of FIG. 8 shown with the door in a lowered position following the disengagement of the link member from the door.

The inner door part 182 also includes mount formations 191 adjacent the left and right sides of the inner door part 182 and located above the mount formations 190. Each of the upper mount formations 191 includes a cylindrical portion defining an opening 193 (the opening 193 for the right-hand upper mount formation 191 is shown in FIG. 11) for engagement with one of the link members 210, 211 of the linkage system in the manner described below.

The inner door part 182 includes side covers 188 extending from the rearward surface of the inner door part 182. When the inner and outer door parts 182, 196 are connected to each other, the side covers 188 extend toward the outer door part 196 (see FIG. 1) to cover peripheral gaps that would otherwise be exposed to view between the inner and outer door parts 182, 196.

The inner door part 182 also defines a notched, or undercut, region 194 adjacent an upper end of the door 180. As will be described below, the notched region 194 of door 180 provides accommodation for a portion of the drawer 150 when the storage compartment 100 is in the opened condition.

The outer door part 196 includes a central opening 198 dimensioned for receipt of the grip 204 of door 180. The grip 204 defines a recessed handhold 206 in a rearward surface of the grip. The grip 204 includes boss formations 208 on a forward surface of the grip for receipt of fasteners (not shown) through aligned openings 202 in a peripheral flange 200 of the outer door part 196 adjacent the grip opening 198. The grip 204 could be joined to the outer door part 196 of door 180 using other known joining methods such as adhesives, snap-fit connection or welding, for example. It is also conceivable that a hand-hold recess could be integrally formed with the outer door part 196 (e.g., in a molding process).

FIG. 5 shows an exploded view including the drawer 150, the left and right link members 210, 211, the left and right spacers 240, 241, and the hinge pins 250. As will described in further detail, the link members 210, 211 are pivotally mounted on the hinge pins 250 and engage both the drawer 150 and the door 180 to form a part of the linkage system of the storage compartment 100. As will also be described below, the spacers 240, 241 are adapted for separation from the hinge pins 250 as part of drawer-removal procedure associated with the storage compartment 100 for access through the interior of the frame 110 to a vehicle area located in front of the frame 110.

The drawer 150 includes a bottom portion 152, a rear wall 154, sidewalls 156 and a front wall 158. The front wall 158 includes a lower part 160 extending substantially vertically from the bottom portion 152 and an upper part 162 extending obliquely from the lower part 160. The lower and upper parts 160, 162 of the drawer 150 are cooperatively-configured with respect to the lower and upper parts 127, 128 of the front wall 126 of frame 110 to provide accommodation between the drawer 150 and the frame 110 (see FIGS. 6 and 7). The bottom portion 152, the rear wall 154, the sidewalls 156 and the lower part 160 of front wall 158 collectively form a tray portion for receiving storage articles placed into the drawer 150.

As shown in FIG. 5, the rear wall 154 of the drawer 150 extends upwardly beyond the adjoining sidewalls 156 to define a lip 164 extending across the rear wall 154. The rear wall lip 164 is arranged for receipt adjacent the undercut region 194 of door 180 when the storage compartment 100 is in the opened condition (see FIG. 7) such that a substantially flush transition exists between adjacent surfaces of the door 180 and the drawer 150.

The drawer 150 includes lower and upper projections 166, 168 on each of the sidewalls 156 (the projections of the right side sidewall 156 is shown in FIG. 5). The lower projections 166 extend horizontally at lower forward portions of the drawer 150 for sliding receipt within the grooves 237 of the rails 230, 231. The upper projection 168 defines a guide track recess 170 including a relatively short horizontal first portion 172 and a relatively long second portion 174 angled obliquely to the first portion 172. A junction 176 is defined between the first and second portions 172, 174 of the guide track recess 170 at a lower end of the obliquely angled second portion 174. As shown, an upper end 178 of the angled second portion 174 of the guide track recess 170 is tapered such that the upper end 178 has a shape that is substantially triangular. Similarly, the horizontal first portion 172 also tapers at a terminal end to define a substantially triangular shape.

As shown in FIG. 5, the left and right link members 210, 211 are configured as mirror images of each other. Each of the link members 210, 211 includes a central pivot portion 212 defining an opening 214 for mounting the link member on one of the hinge pins 250 for pivot of the link member about a pivot axis, A, defined by the hinge pin 250 and the opening 214 (see FIGS. 6 and 7). Each link member 210, 211 also includes a front arm portion 216 and a rear arm portion 220. In the closed condition of FIG. 6, the front arm portion 216 extends upwardly and forwardly from the central pivot portion 212 to a bend 217. The rear arm portion 220 extends upwardly and rearwardly from the central pivot portion 212 to a bend 222. As shown in the closed condition of FIG. 6, the arm portions 216, 220 extend generally horizontally from the bends 217, 222, respectively, to a distal (terminal) end. As shown, the bend 222 for the rear arm portion 220 is located adjacent to the distal end, while the bend 217 for the front arm portion 216 is intermediately located on the front arm portion 216. As shown, the front and rear arm portions 216, 220 include substantially straight sections of the arm portions located on opposite sides of each of the bends 217, 222.

Figure 7:
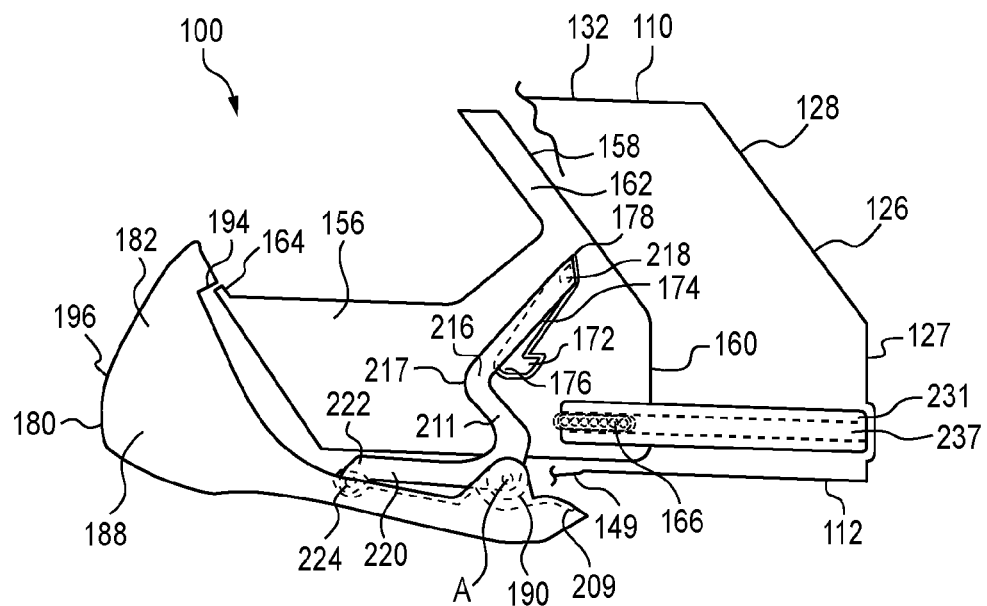
FIG. 7 is a schematic view of the vehicle storage compartment of FIG. 2.
Figure 8:
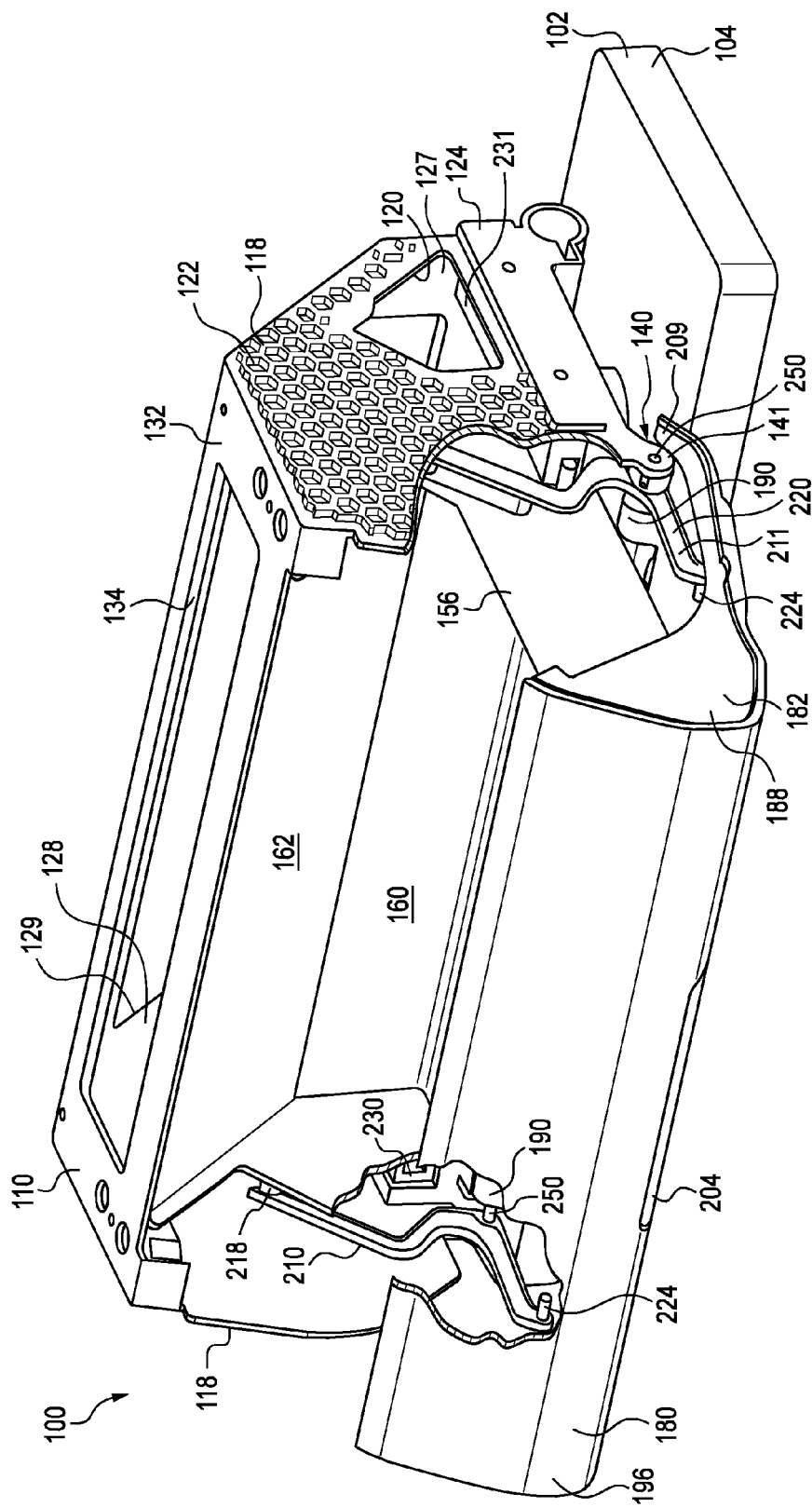
FIG. 8 is a perspective view of the vehicle storage compartment of FIG. 2 with portions of the frame and the door removed for clarity of the view, and shown following removal of the spacers from the vehicle storage compartment.

Each of the link members 210, 211 includes a drawer post 218 located adjacent the distal end of the front arm portion 216 and a door post 224 located adjacent the distal end of the rear arm portion 220. Because of the mirrored construction of the left and right link members 210, 211, which are located on opposite sides of the drawer 150, the posts 218, 224 for both link members 210, 211 will project inwardly from the arm portions 216, 220 towards the drawer 150. The door posts 224 on the rear arm portions 220 are substantially circular in cross section, while the drawer posts 218 on the front arm portions 216 include a tapering portion having a substantially triangular cross section. The drawer posts 218 on the front arm portions 216 are received in the sidewall guide track recesses 170 of drawer 150 to engagingly interconnect the drawer 150 and the left and right link members 210, 211. The door posts 224 on the rear arm portions 220 are received in the openings 193 of the mount formations 191 to engagingly interconnect the door 180 and the left and right link members 210, 211. As illustrated in FIG. 7, the drawer posts 218 of the front arm portions 216 and the guide track recess 170 are cooperatively-configured such that the drawer posts 218 fit within the tapered upper end 178 of the guide track recess 170 when the storage compartment 100 is in the opened condition. It should be understood that the link members 210, 211 and the guide track recesses 170 could be modified from the forms shown in the depicted embodiment. For example, the drawer posts 218 could be substantially circular in cross section for interfit within a curved upper end of the guide track recess 170.

Referring again to FIG. 5, the left and right spacers 240, 241 are also configured as mirror images of each other. Each spacer 240, 241 includes a disc-shaped body 242 defining an elongated slot opening 244 extending in a generally radial direction from an outer periphery of the body. The slot opening 244 is open-ended and has a width sufficient for receipt of the spacer onto the hinge pins 250 and removal of the spacers from the hinge pins 250.

The body 242 of each spacer 240, 241 also defines an upper notch 246 extending transversely to the slot opening 244 across a majority of the thickness for the spacer 240, 241. Because of the mirrored construction, the upper notch 246 of the left spacer 240 extends from a leftward end of the spacer, while the upper notch 246 of the right spacer 241 extends from a rightward end of the spacer. The upward location of the notches 246 on the spacers 240, 241 facilitates a removal of the spacers from an engaged condition on the hinge pins 250 (e.g., using a tool engageable with the upper notch 246 for application of a pulling force). The spacers 240, 241 could be modified from those depicted to include differing features for engaging the hinge pins 250. As those skilled in the art should understand, the spacers could include Beta pins or clip-like features providing engagement between the spacers and the hinge pins.

As discussed above, the hinge pins 250 are received in the openings 142, 146 of the outer and inner portions 141, 144 of the pin mounts 140 of frame 110 to extend across the spaces 148 defined between the outer and inner portions 141, 144. The hinge pins 250 are also received by the pin openings 192, 214, 244 of the door 180, the link members 210, 211, and the spacers 240, 241, respectively, which are aligned in the spaces 148. As illustrated in FIG. 2, the pin mount formations 190 of door 180, the central pivot portion 212 of link members 210, 211 and the body 242 of spacers 240, 241 are dimensioned to substantially fill the spaces 148 of the pin mounts 140.

Referring to FIGS. 1, 2, 6, and 7, the operation of the linkage system of the storage compartment 100 during movement of the storage compartment between closed and opened conditions is illustrated. The linkage system for the depicted storage compartment 100 is collectively formed by the link members 210, 211, the hinge pins 250, the mount formations 190, 191 of door 180, the pin mounts 140 of frame 110, the lower sidewall projections 166 of drawer 150, the rails 230, 231, and the guide track recesses 170 of drawer 150.

As shown in FIG. 1, a top edge of the door 180 is adjacent the top wall 132 of frame 110 in the closed condition. In this position, the door 180 closes the open rearward portion of the frame 110 with the drawer 150 enclosed within the interior of the frame 110 (i.e., in a stored (retracted) position with respect to the frame 110). The lower and upper parts 160, 162 of the front wall 158 of drawer 150 are accommodated adjacent to the cooperatively formed lower and upper parts 127, 128 of the front wall 126 of frame 110. In the closed condition shown in FIG. 6, the drawer posts 218 on the front arm portions 216 of link members 210, 211 are located at the bottom of the guide track second portions 174 at the junction 176 between the first and second portions 172, 174. In the closed condition, the lower projections 166 on the sidewalls 156 of drawer 150 are forwardly located in the groove 237 of rails 230, 231.

In FIGS. 2 and 7, the storage compartment 100 is shown in the opened condition. The door 180 has been moved to the opened door position (e.g., by a user grasping the recessed handhold 206 of grip 204 and rotating/lowering the door 180). As shown, the door 180 has been rotated (in a counterclockwise direction from FIG. 6 to FIG. 7) about the pivot axis A defined by the hinge pins 250. As should be understood, each of the link members 210, 211 is constrained to pivot with the door 180 through a common angle of rotation because of the interconnection provided by the link mount formations 191 of door 180.

As shown in FIG. 7, the rear arm portions 220 of link members 210, 211 in the opened condition now extend rearwardly from the pivot axis A in a substantially horizontal orientation while the front arm portions 216 extend generally upwardly to the distal end. The engaged connection between the drawer posts 218 of link members 210, 211 and the guide track recesses 170 of drawer 150 causes the drawer 150 to translate as the door 180 and the interconnected link members 210, 211 are rotated. The drawer 150 is constrained to translate (slide) horizontally because of the constraint provided between the rails 230, 231 and the lower projections 166 on drawer 150. The oblique angle for the second portion 174 of the guide track recesses 170 is selected such that the circular pathway that the drawer posts 218 on link members 210, 211 are constrained to follow is matched to the desired horizontal sliding of the drawer 150 with respect to the frame 110.

As shown in FIG. 7, the drawer 150 in the opened condition has slid rearwardly to a deployed (extended) position in which a substantial portion of the drawer 150 is located outside of the interior defined by the frame 110. In the deployed position, the lip 164 on rear wall 154 of the drawer is substantially flush within the undercut notch 194 at the top of door 180. The engaged drawer posts 218 of link members 210, 211 have slid to the upper ends 178 of guide track recesses 170, while the lower projections 166 of the drawer 150 have slid to a rearward end of the rails 230, 231.

As should be understood, the linkage system of the storage compartment 100 will drive the drawer 150 in an opposite direction when the compartment 100 is moved from the opened to the closed condition. More particularly, the clockwise rotation of the door 180 and the link members 210, 211 (with respect to the view shown in FIGS. 6 and 7) will drive the drawer 150 forwardly into the interior of frame 110 through the combined constraints provided by the drawer posts 218 of link members 210, 211 in the guide track recesses 170 of drawer 150 and the lower projections 166 of drawer 150 in the rails 230, 231.

Figure 6:
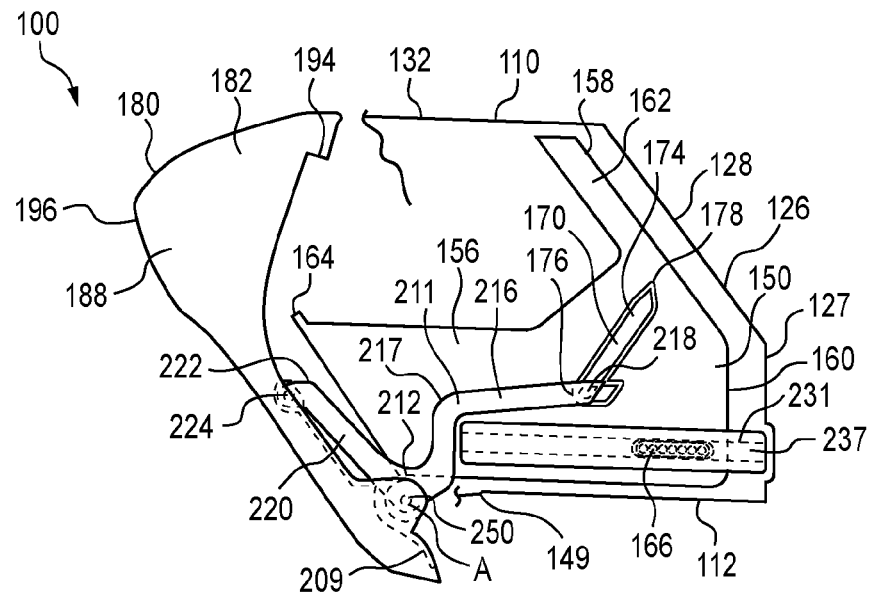
FIG. 6 is a schematic view of the vehicle storage compartment of FIG. 1.

As described above, the drawer posts 218 of link members 210, 211 move within the obliquely angled second portions 174 of the guide track recesses 170 between the junction 176 and the upper end 178 as the door 180 is pivoted between closed and opened positions (compare FIGS. 6 and 7). Therefore, during normal operation of the depicted storage compartment 100, the horizontal first portions 172 of the guide track recesses 170 are not used. The normally-unused first portions 172 of the guide track recesses 170 function (when the storage compartment is in the closed condition) to prevent a rearward movement of the drawer 150 relative to the frame 110 from back-driving the linkage system and potentially opening the door 180. As should be understood, a back-driving situation would involve a condition in which a rearward impetus (momentum) applied to the drawer 150 drives the linkage system in a reversed fashion to open the door 180 (in contrast to the normal drive condition in which the driving impetus is applied to the door 180 to move the drawer 150). Such relative movement of the drawer 150 in a rearward direction could result from an inertial condition (e.g., during certain collision events).

Referring to FIG. 6, in response to a rearward impetus (or inertial condition) applied to the drawer 150 in the closed condition tending to move the drawer 150 rearwardly with respect to the frame 110, the drawer posts 218 of link members 210, 211 would shift into the first portions 172 of the guide track recesses 170. As shown, the triangular portion of the first guide track portion 172 is oriented at an angle that matches the orientation of the triangular portion of the drawer posts 218 of link members 210, 211 in the closed condition. Oriented in this manner, the drawer posts 218 will interfit with the ends of the first guide track portions 172. With the drawer post 218 received in the first portion 172 of guide track recess 170, an interlock is created preventing the drawer post 218 from sliding upwardly in the second guide track portion 174 and backward-driving the linkage system. As one skilled in the art should understand, the storage compartment 100 could include a release mechanism (not shown) (e.g., a spring-driven mechanism) for unlocking the drawer 150 by shifting the drawer 150 forwardly with respect to the frame to allow for opening of the door 180.

Each of the frame 110, the drawer 150, the doors 180, the link members 210, 211, the rails 230, 231 and the spacers 240, 241 could be made from a plastic material (e.g., in a molding process). A plastic material(s) would provide desirable strength/rigidity while optimizing weight considerations. However, the use of plastics is not required and any suitable materials could be used. For the hinge pins 250, the use of a metal material could provide strength, durability and friction considerations. However, this is not a requirement and other materials could be used.

Referring now to FIGS. 8-14, a drawer-removal procedure associated with the storage compartment 100 is illustrated. In the view shown in FIG. 8, portions of the door 180 have been removed for the clarity of the view. As shown, the spacers 240, 241 have been removed from the assembly of the storage compartment 100. The removal of the spacers 240, 241 could be effected, for example, through the insertion of a removal tool (not shown) into the upper notches 246 of the spacers and the application of a pulling force to separate the vehicle slot opening 244 of the spacer from the hinge pin 250.

Figure 9:
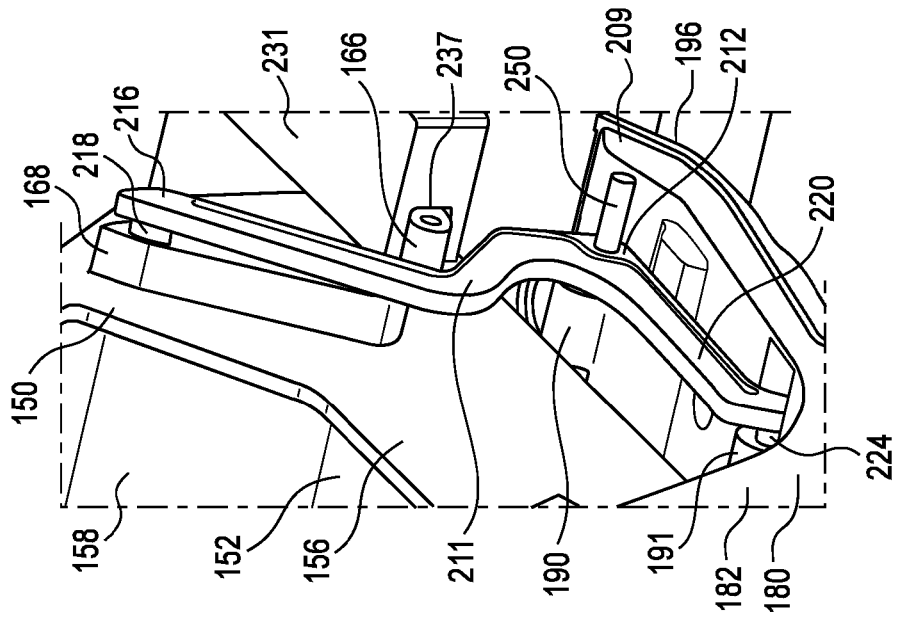
FIG. 9 is an enlarged perspective view of a portion of the vehicle storage compartment of FIG. 8 shown without the frame for clarity of the view and with the right link member in engaged condition.
Figure 10:
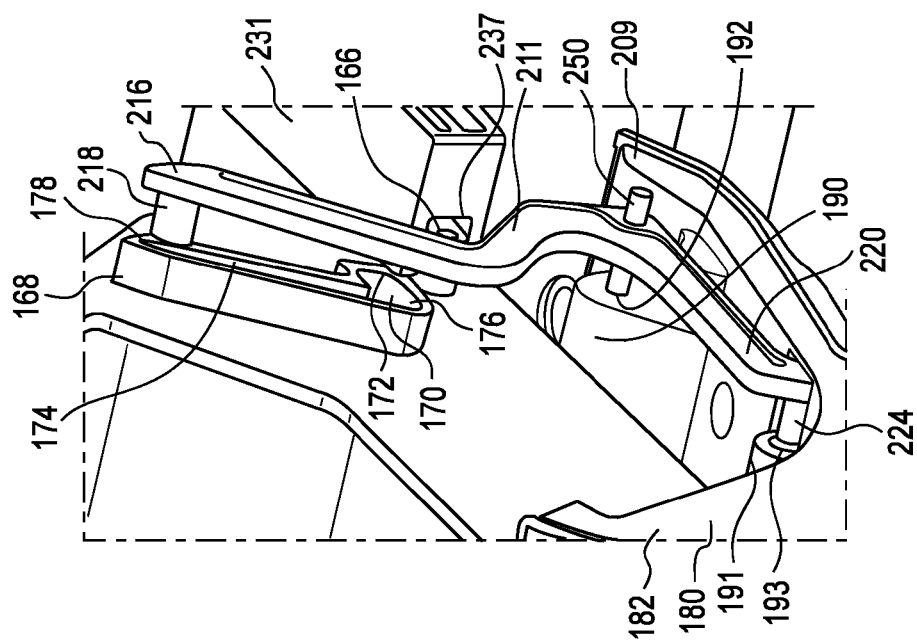
FIG. 10 is an enlarged perspective view of the portion of the vehicle storage compartment of FIG. 9 with the right link member in a disengaged condition.

Referring to FIGS. 9 and 10, an enlarged portion of the storage compartment 100 including right link member 211 is shown without the frame 110 for clarity of the view. FIGS. 9 and 10 respectively illustrate engaged and disengaged conditions for the link member 211 associated with a second step of the drawer-removal procedure following the above-described first step of removing the spacers 240, 241. In FIG. 9, the door post 224 on the rear arm portion 220 of link member 211 is still engaged in the opening 193 of the mount formation 191 of door 180 and the drawer post 218 on the front arm portion 216 is engaged in the guide track recess 170 of drawer 150.

As shown in FIG. 9, the right link member 211 is located on the hinge pin 250 to the right of the mount formation 190 of door 180 defining the opening 192 for the hinge pin 250. The right link member 211 is located in close proximity to the mount formation 190 (i.e., in the normal operating position for the link member 211) and could be in contact with the mount formation 190. As should be understood, a portion of the empty space on the hinge pin 250 that is shown to the right of the link member 211 represents the space that would be occupied by the spacer 241 in the normal operating condition of storage compartment 100 (see FIG. 2).

Referring to FIG. 10, the disengagement of link member 211 during the second step of the drawer-removal procedure is illustrated. As shown, the right link member 211 has been translated along hinge pin 250 in an outward direction (to the right in the point of view shown in FIGS. 9 and 10) from the engaged position of the link member 211 in FIG. 9. The right link 211 has been translated (i.e., slid) a sufficient distance along the hinge pin 250 such that the drawer post 218 of the link member 211 is now disengaged (disconnected) from the guide track recess 170 of drawer 150 and the door post 224 is disengaged (disconnected) from the opening 193 defined by the upper mount formation 191 of door 180. As should be understood, the disengagement (disconnection) of the left link member 210 will be effected by an outward translation of the link member 210 on the associated hinge pin 250 (i.e., in a leftward direction from the point of view shown in the figures) for a similar distance.

As shown in FIGS. 9 and 10, the upper mount formations 191 on the inner part 182 of door 180 include the above-described cylindrical portions defining the openings 193 for the door posts 224 of link members 210, 211. The upper mount formations 191 also define a recess on the forward surface of the inner door part 182 that is located outwardly from the openings 193 (i.e., to the right of the opening 193 in FIGS. 9 and 10). These two portions of the upper mount formations 191 can also be seen in the view of the rearward surface of the inner door part 182 shown in FIG. 4. As shown in FIGS. 9 and 10, a terminal portion of the rear arm portion 220 of link members 210, 211 that carries the door post 224 is received in the recess of upper mount formation 191 to align the door post 224 with the opening 193. As shown, the recess of the mount formation 191 is elongated such that it accommodates the terminal end portion of the link member that carries the door post 224 in both the engaged and disengaged conditions for the link member.

Figure 12:
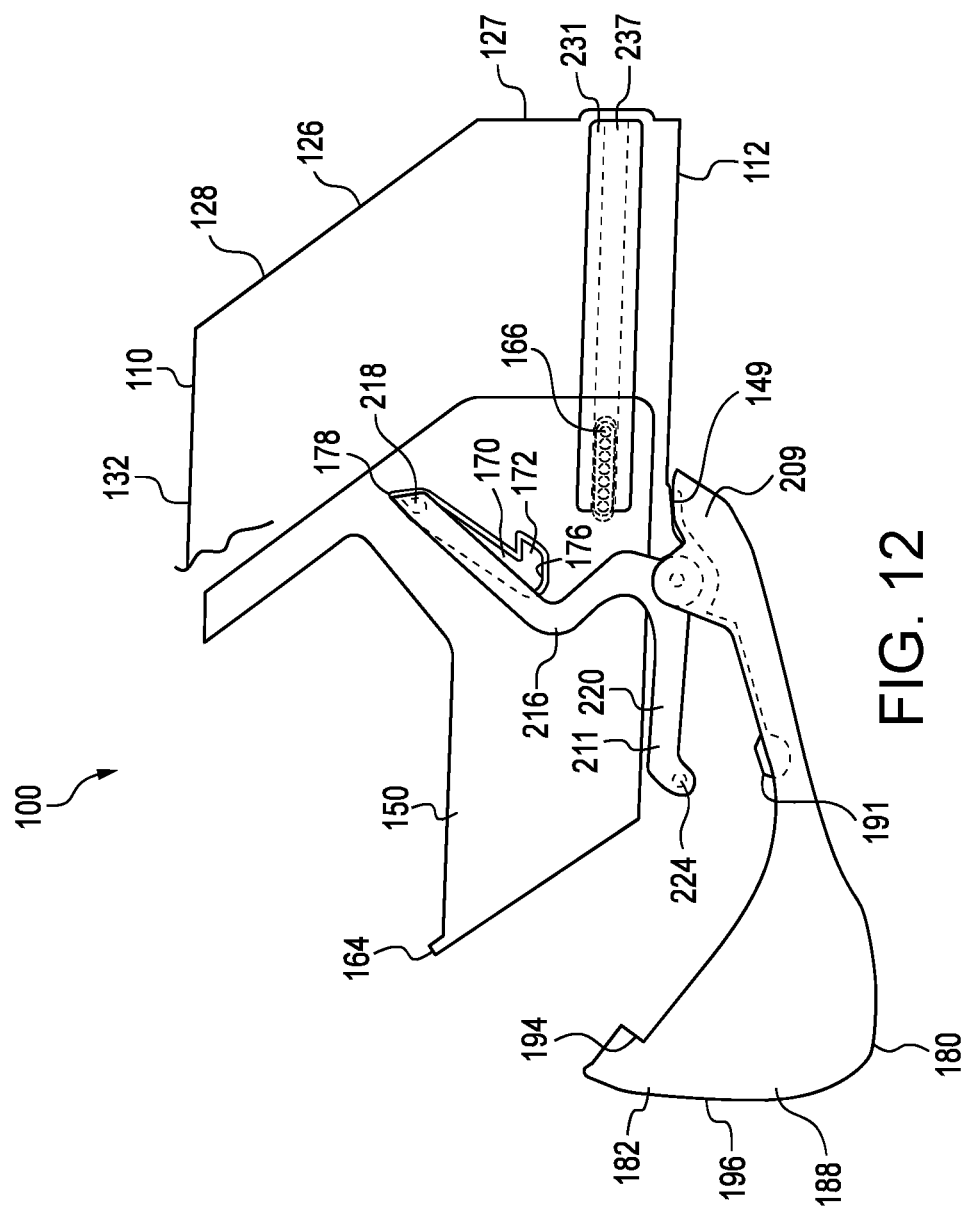
FIG. 12 is a schematic view of the vehicle storage compartment of FIG. 11.

Referring to FIGS. 11 and 12, a third step in the drawer-removal process following the above-described second step of disconnection (disengagement) of the left and right link members 210, 211 is illustrated. As shown, the disengagement of the door posts 224 of link members 210, 211 from the link mount formations 191 of door 180 eliminates the constrained co-rotation between the door 180 and the link members 210, 211. In this released condition, the door 180 is free to rotate further (in a counterclockwise direction in FIG. 12) beyond the opened position for the door 180 associated with the normal operating condition to a fully-lowered position.

As illustrated in FIG. 12, the depicted storage compartment 100 includes a stop feature for limiting the otherwise free rotation of the door 180 with respect to the frame 110, and to define the fully-lowered position of the door 180. The stop feature includes a projecting portion 209 of the door 180 that extends at a lower end of the door 180 beyond the pivot connection of the door at the pivot axis A. As shown, the projecting portion 209 of door 180 is configured such that the inner door part 182 contacts an angled surface 149 on frame 110.

The fully-lowered position of door 180 facilitates the removal of the drawer 150 from the assembly of the storage compartment 100 in a fourth step of the drawer-removal procedure (e.g., by lifting the drawer 150 in a generally rearward direction away from the interior of the frame 110). The open rearward end 238 of the groove 237 of rails 230, 231 allows for a sliding separation of the lower drawer projections 166 from the rails as the drawer 150 is lifted in a generally rearward direction from the frame 110.

Figure 13:
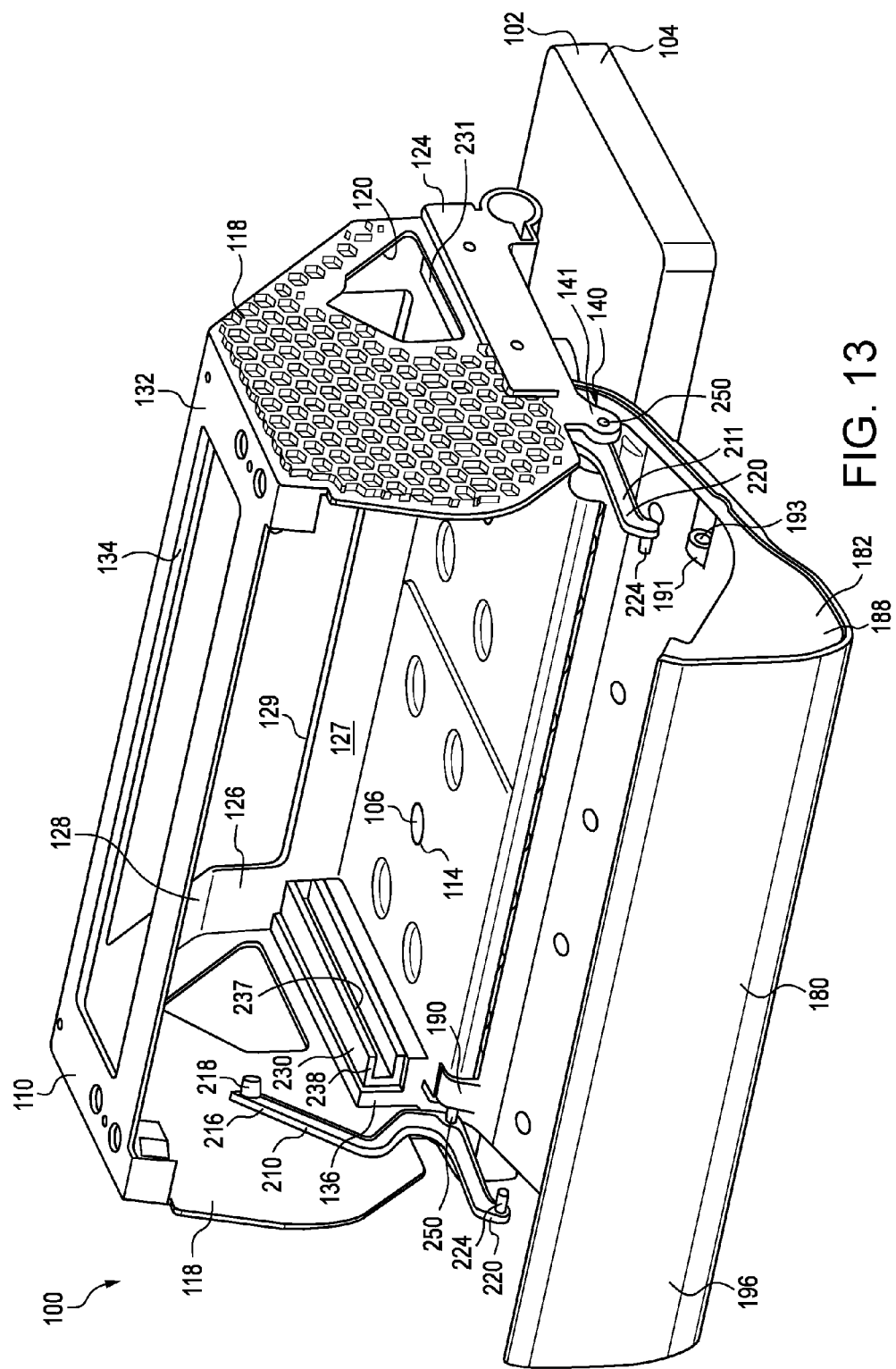
FIG. 13 is a perspective view of the vehicle storage compartment of FIG. 11 after removal of the drawer from the vehicle storage compartment.
Figure 14:
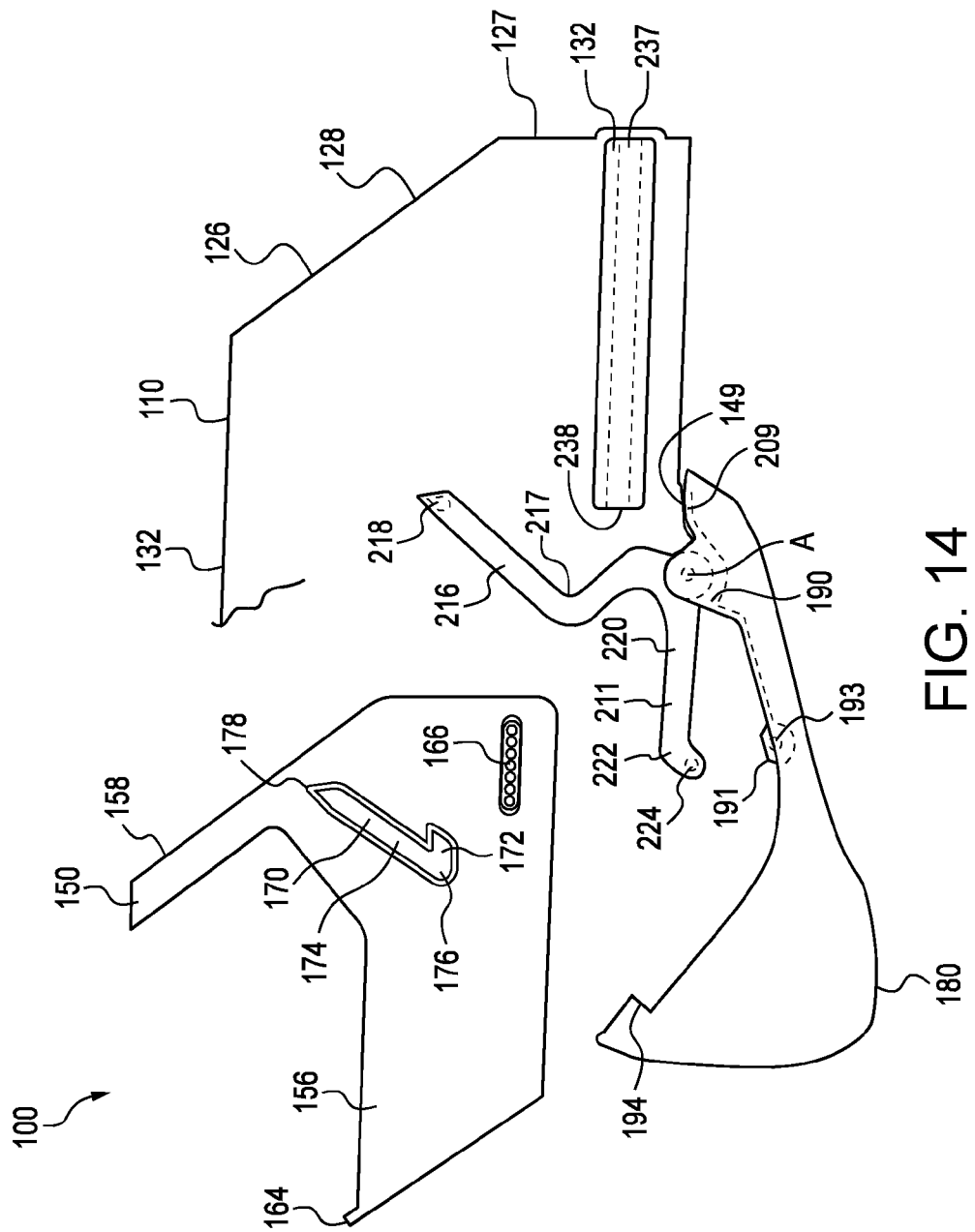
FIG. 14 is a schematic view of the vehicle storage compartment of FIG. 13 showing the door in a disengaged and lowered condition and the drawer in a separated condition with respect to the frame.

Referring to FIGS. 13 and 14, the storage compartment 100 is shown following the separation of the drawer 150 from the frame 110 with the door 180 in the fully-lowered position. As can be seen in FIG. 13, the lowering of the door 180 to the fully-lowered position, and the removal of the drawer 150 from the assembly, clears the interior of frame 110. Such clearance facilitates access through the interior of the frame 110 from the front of the storage compartment 100, and through the opening 129 in the front wall 126 of frame 110, to a vehicle location that is in front of the frame 110. In one embodiment, such access could be useful for reaching a vehicle HVAC duct (not shown) (e.g., for removal and replacement of a filter from the duct through the empty interior of the frame 110 and through the open rearward end of the frame).

The foregoing detailed description of one or more exemplary embodiments is included for illustrative purposes only. It should be understood that other embodiments could be used, or modifications and additions could be made to the described embodiments. Therefore, the invention is not limited to the embodiments shown, but rather should be construed in breadth and scope in accordance with the recitations of the appended claims.

The invention claimed is:

1. A storage compartment for a vehicle, comprising:
   a frame defining an interior;
   a door pivotally connected to the frame for pivot of the door about a pivot axis between closed and opened positions of the door;
   a drawer translatable with respect to the frame for translation between a stored position in which the drawer is disposed within the interior of the frame and a deployed position in which at least a portion of the drawer is located outside of the interior, the drawer including opposite first and second sidewalls; and
   a linkage system interconnecting the door and the drawer such that pivoting of the door about the pivot axis between the closed and opened positions causes sliding movement of the drawer between the stored and deployed positions,
   the linkage system including at least one link member connected to the door such that the link member pivots with the door during movement of the door between the closed and opened positions, the link member including a drawer post engaging one of the sidewalls of the drawer.

2. The storage compartment of claim 1, further comprising at least one rail secured to the frame, the rail including an elongated groove, and wherein the drawer includes an elongated projection slidably engaging the groove of the rail.

3. The storage compartment of claim 2, wherein frame includes a rail mount on which the rail is secured, the rail mount having a cross-section that is generally L-shaped.

4. The storage compartment of claim 1, wherein the sidewall of the drawer includes an elongated guide track recess engagingly receiving the drawer post of the link member to interconnect the link member and the drawer.

5. The storage compartment of claim 4, wherein the guide track recess is defined by a projection extending outwardly from the sidewall of the drawer.

6. The storage compartment of claim 4, wherein the guide track recess includes first and second portions, the first portion of the recess substantially horizontal and the second portion angled obliquely to the first portion, and wherein the drawer post is engageable with the first portion of the recess with the door in the closed position to lock the linkage system and prevent the door from being opened.

7. The storage compartment of claim 4, wherein the guide track recess includes at least one end that is generally triangular in shape, and wherein the drawer post includes a portion that is generally triangular in shape for interfit with the end of the guide track recess.

8. The storage compartment of claim 1, wherein the link member includes elongated front and rear arm portions, the front arm portion including the drawer post and the rear arm portion engaged to the door, and wherein the front arm portion is longer than the second arm portion and includes a bend between substantially straight sections of the front arm portion.

9. The storage compartment of claim 8, wherein the rear arm portion of the link member includes a bend between substantially straight sections of the rear arm portion, and wherein a terminal end part of the rear arm portion is received in a recess defined by the door.

10. The storage compartment of claim 9, wherein the terminal end part of the rear arm portion of the link member includes a door post received in an opening defined by the door.

11. The storage compartment of claim 4, wherein the link member includes a central pivot portion and front and rear arm portions extending from the central pivot portion, the front arm portion including the drawer post, and wherein the rear arm portion includes a door post engaging an opening defined by the door.

12. The storage compartment of claim 11, wherein the central pivot portion of the link member defines an opening for pivotal support of the link member on a hinge pin, the hinge pin secured to the frame, and wherein the link member is translatable along the hinge pin for disengagement of the drawer post from the guide track recess and disengagement of the door post from the door.

13. The storage compartment of claim 12, further including a spacer received on the hinge pin, the spacer being removable from the hinge pin to provide space on the hinge pin for translation of the link member along the hinge pin.

14. The storage compartment of claim 12, further comprising a stop mechanism for limiting an unconstrained pivoting of the door beyond the opened door position following disengagement of the door post of the link member from the door, the stop mechanism including a projecting portion of the door extending beyond a pivot axis for the door, the extending portion of the door having a surface arranged to contact a stop surface of the frame to define a fully-lowered position of the door.

15. A storage compartment for a vehicle, comprising:
   a frame including first and second sidewalls defining an interior;
   a door pivotally connected to the frame for pivot of the door about a pivot axis between closed and opened positions of the door;
   a drawer slidably supported for movement between a retracted position in which the drawer is disposed within the interior of the frame and a deployed position in which at least a portion of the drawer is located outside of the interior, the drawer including first and second sidewalls, each sidewall including a guide track recess and an elongated projection;
   first and second rails respectively secured to the first and second sidewalls of the frame, each of the rails including an elongated recess, the elongated projections of the first and second sidewalls of the drawer slidably engaging the recesses of the first and second rails respectively; and first and second links disposed adjacent to the first and second sidewalls of the drawer, each of the links including a drawer post, the drawer posts of the first and second links respectively engaging the guide track recesses on the first and second sidewalls of the drawer such that pivoting of the door causes sliding movement of the drawer.

16. The storage compartment of claim 15, wherein each link is connected to the door such that the link pivots with the door, the connection between the link and the door being disconnectable such that the door is free to rotate beyond the opened position of the door to a fully lowered position.

17. The storage compartment of claim 16, wherein the door includes a stop projection contacting a stop surface of the frame for limiting the disconnected pivoting of the door and to define the fully lowered position of the door.

18. The storage compartment of claim 16, further comprising first and second hinge pins supported by the frame to define the pivot axis, the first and second hinge pins receiving a pivot portion of the first and second links, and wherein each link includes a door post received by a link mount formation of the door, and wherein the first and second links are translatable along the first and second hinge pins to disconnect the first and second links from the door.

19. The storage compartment of claim 18, wherein the translation of the link along the hinge pin to disconnect the door post from the door also disconnects the drawer post from the drawer.

20. A storage compartment for a vehicle, comprising:
a frame defining an interior;
a drawer slidably mounted in the interior of the frame and defining a guide track recess;
a door pivotally connected to the frame for pivot between closed and opened positions; and
a link member including a drawer post and a door post, the drawer post engageable with the guide track recess of the drawer and the door post engageable with a link mount formation on the door in an engaged link condition in which pivoting of the door causes sliding of the drawer, the link member pivotally mounted on a hinge pin such that the link member pivots with the door between the closed and opened positions, the link member translatable along the hinge pin to shift the link member to a disengaged link condition in which the door post and the drawer post are respectively disengaged from the door and the drawer, the disengagement of the door post from the door allowing the door to pivot separately from the link member to a fully-lowered position of the door, the disengagement of the drawer post from the drawer allowing the drawer to be separated from the frame.

* * * * *